United States Patent Office 3,294,644
Patented Dec. 27, 1966

3,294,644
METHOD OF REDUCING CORROSION CONDITIONS IN A WATER-COOLED NUCLEAR REACTOR
Gilbert Northcott Walton, Abingdon, England, assignor to United Kingdom Atomic Energy Authority, London, England
Filed June 5, 1964, Ser. No. 372,835
Claims priority, application Great Britain, June 10, 1963, 23,019/63
4 Claims. (Cl. 176—38)

The present invention relates to the prevention of corrosion and is particularly concerned with the prevention of corrosion in water-cooled nuclear reactors.

It will be appreciated that in any type of nuclear reactor it is desirable that corrosion by the coolant of the fuel cans, structural members, coolant circulating apparatus, heat exchangers, etc., should be reduced to a minimum and in so doing reduce the tendency for corrosion products to be deposited on fuel elements. In many water-cooled reactors the material of the fuel can is a zirconium alloy which is resistant to corrosion by the water coolant, but the structural material is either stainless steel or mild steel and both of these materials are liable to corrosion by the water coolant. The problem is particularly severe if the coolant is pressurized and therefore very hot, for example in pressurized water and boiling water reactors or steam-cooled reactors. A major cause of corrosion under certain circumstances is the presence of radiolytic products, particularly oxygen, which are formed by irradiation of the water coolant, and it should be realized that control of both pH and reducing conditions is necessary to provide correct control of the corrosion conditions as both factors have an effect.

It will be known that three regimes in water-cooled reactors can exist namely:
 (a) Pressurized water (i.e. non-boiling)
 (b) Boiling water
 (c) Steam (including superheating).

The conditions in reactors operating under these regimes are, of course, very different and the corrosion problems, although similar, differ in important details. Hitherto different expedients have been necessary for corrosion control in each case but one advantage of the present invention is that it provides a solution applicable to all regimes.

In order to assist in comprehension of the invention, the problems and some prior expedients will now be discussed for each regime.

When operating in the pressurized regime, the pressure, exerted by a gas blanket, on the water is such that at the temperature of operation, for example 200° C.–370° C. no boiling takes place. Hitherto in reactors operating under this regime it has been the practice to add potassium hydroxide to the coolant in order to raise its pH, hydrogen also being added to the coolant to establish reducing conditions and effectively to suppress the formation of the radiolytic oxygen products which cause corrosion. However, irradiation of potassium hydroxide will give rise to radioactive species which are liable to cause radioactivity problems in the reactor.

It is possible to replace the potassium hydroxide by lithium hydroxide, but on irradiation this can give rise to tritium which can give rise to other radioactivity problems unless the pure lithium-7-isotope is used.

When operating in the boiling regime, the pressure is super-atmospheric and is controlled so that at the temperature of operation boiling takes place in the fuel channels and the product is wet steam which may be used in the conventional manner to drive a turbine or may be passed through a heat exchanger to heat a working fluid. In such a regime it is not really practicable to use an alkali metal hydroxide for the control of pH as it is liable to be deposited on surfaces and by accumulation could cause stress cracking.

When operating in the steam-cooled regime, the pressure is again super-atmospheric and wet or dry steam is used as the coolant. In some cases, this regime is only applied to some channels, i.e. superheat channels, of a reactor operating generally in the boiling regime. Inevitably the wet steam fed to the reactor (or superheater) will contain some chloride contamination and this chloride tends to accumulate in the parts of the reactor where drying occurs and sets up stress cracking in the highly stressed parts.

It should also be mentioned that, in any regime, the use of free hydrogen to control the reducing conditions is extremely expensive if the coolant passes directly to a turbine, i.e. is not contained in a closed coolant circuit, or if it is necessary to vent a closed coolant circuit from time to time. Moreover, even in closed coolant circuits, it appears to be inevitable that a leak of hydrogen will take place and this involves the addition of make-up hydrogen from time to time which can be very undesirable.

Corrosion problems also arise in the conventional, i.e. non-nuclear boilers and under these circumstances it is known to use ammonia in very low concentrations, i.e. below 1 p.p.m. by weight, to control the pH and to add hydrazine to control the reducing conditions by removing free oxygen, it being apparent that the hydrazine also has an effect on the pH conditions. However, hydrazine is not suitable for use in nuclear reactors as it is excessively radiation sensitive. Moreover, only nuclear boilers produce free oxygen by radiolysis of the water, the oxygen present in conventional boilers being derived from that in solution in the boiler feed water.

According to the present invention there is provided a method for reducing the corrosion conditions in a water-cooled nuclear reactor, such method comprising the addition of ammonia to give concentrations from 4 to 60 p.p.m. by weight in the coolant.

According to a further aspect of the invention there is therefore provided a coolant for a nuclear reactor comprising water containing from 4 to 60 p.p.m. by weight of ammonia.

It is to be understood that in this specification the term "water" is used broadly and includes steam.

The present invention is based upon the discovery that ammonia in the concentrations above specified not only controls the pH of the water but also controls the reducing conditions. Thus, the use of ammonia for controlling the pH obviates the need to add hydrogen to the coolant to control the reducing conditions as was the case hitherto. Experiments have shown that the addition of this quantity of ammonia serves to reduce the free oxygen in the circuit to below the detectable level of 0.01 p.p.m.

The ammonia may be added continuously to the coolant in an amount calculated to be sufficient to replace any loss and this may be effected by the direct injection of ammonia gas into the coolant circuit or by the addition of a solution of ammonia in water or by the passage of a part or all of the coolant through an ammoniated ion exchange resin in an exchange column, this latter expedient being useful if a coolant cleanup plant is provided for any other reason.

During experiments with ammonia concentrations according to the invention no adverse effects have been observed. Indeed, in the pressurised regime, the crud quality and level or improved, whilst in the steam-cooled regime the tendency for stress cracking is reduced. A very low concentration of nitrate ion is detectable in the coolant and presumably arises from the radiolysis of ammonia, but the concentration tends to equilibrium in the range 0.05 to 0.1 p.p.m. The presence of nitrate ions at the level detected does not appear to have any corrosive effects.

It has been specified above that the concentration of ammonia should be in the range 4–60 p.p.m. by weight but the optimum value depends on conditions in the reactor and the regime under which it is operated. If corrosion is to be prevented in a pressurised water reactor constructed of the conventional stainless steel used in nuclear reactors and known as 316L, then 4 p.p.m. gives adequate control and 7 p.p.m. provides the maximum effect. However, slightly greater concentrations are preferred for ease in controlling the ammonia content. If, on the other hand, corrosion of mild steel is to be prevented, these concentrations of ammonia are rather low and a minimum concentration of 15 p.p.m. is desirable, the optimum effect being attained in the range 20–25 p.p.m.

When operating in the boiling regime or in the steam-cooled regime using wet steam, 4 p.p.m. of ammonia has proved to be satisfactory and allows mild steel to be used in place of stainless steel. If superheat channels are provided, the steam generated in other portions of the reactor will be oxygen-free and therefore very suitable for feeding to the superheat channels.

At the other end of the range of suitable concentrations, up to about 60 p.p.m. can be tolerated in a pressurised water reactor without disadvantage and gives substantially all the protection required, but above this concentration the amount of ammonia present in the coolant is so great that the extent of radiolysis is naturally increased. From the point of view of this invention therefore, 60 p.p.m. should be considered the maximum concentration of ammonia, but, provided other considerations do not make it undesirable, additional ammonia may be added, e.g. for operational convenience although it will be substantially ineffective for the purposes of the present invention.

In a boiling water reactor where the reactor coolant is fed directly to a turbine, ammonia concentration occurs at the turbine condenser exhaust. It is therefore preferred that the concentration of ammonia in the coolant should be kept below 20 p.p.m.

Throughout this specification no distinction has been made between heavy and light water. In a heavy water reactor circuit the deuterated form of ammonia should be used unless the reactor can tolerate a buildup in the concentration of natural hydrogen.

In order that the present invention may more readily be understood, three experiments using the same will now be described by way of example, and with reference to the accompanying drawings wherein.

Figure 1:
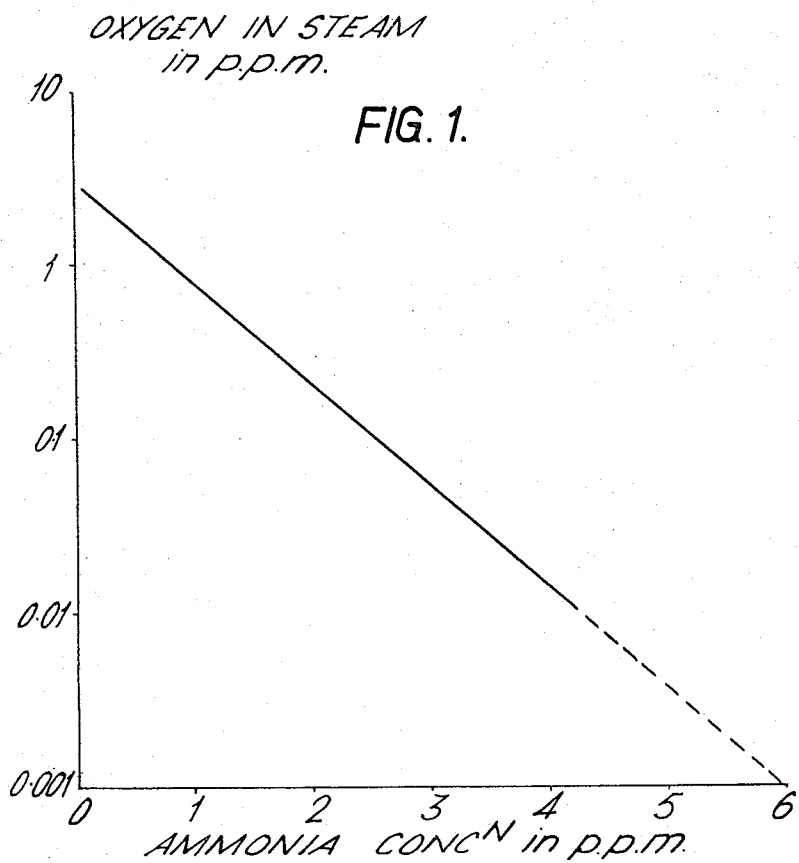
FIGURE 1 is a graph showing ammonia concentration vs. oxygen concentration.

In the first experiment, the High Pressure Water Loop of the reactor DIDO was used and was operated at a temperature of 290° C., a pressure of 140 kg./cm.$^2$ (2000 p.s.i.) and in a radiation field of $1.5 \times 10^{14}$ n/cm.$^2$/sec. (thermal). Since this loop is provided with a water purification section, an ammoniated ion exchange resin was used to introduce the ammonia.

Suitable corrosion test specimens were located at appropriate positions in the loop.

The criculating water was tested for the presence of radioactive species by removing samples of the water from the purification and sampling section of the loop. The results obtained are summarised in the table given below:

| pH | Conductivity ($\mu$mhos) | P.p.m. ($NH_3$) | Gross $\beta$ (d.p.m./ml.) |
|---|---|---|---|
| 10.45 | 66 | 53 | $1.05 \times 10^3$ after 1½ hrs. |
| 10.45 | 47 | 36 | $2.34 \times 10^3$ after 1 hour. |
| 10.5 | 50 | 43 | $5.22 \times 10^3$ after 1 hour. |
| 10.5 | 56 | 57 | $4.86 \times 10^3$ after ½ hour. |
| 10.5 | 28 | 20 | $5.58 \times 10^3$ after 1½ hrs. |
| 10.3 | 31 | 17 | $5.78 \times 10^3$ after 1 hour. |
| 10.0 | 30 | 17 | $7.65 \times 10^3$ after 1 hour. |

The activity figures given in the above table may be compared with values of about $9 \times 10^4$ d.p.m./ml. which were obtained after 1½ hours delay from samples taken from the loop when potassium hydroxide and hydrogen were used to control the corrosion conditions. The activities of certain of the individual active species present, for example $Cs^{138}$, $F^{18}$ and $K^{42}$, were also determined, and compared with corresponding results, obtained using potassium hydroxide and hydrogen. It was found that the activity due to $Cs^{138}$, and also that due to $F^{18}$, remained at approximately the same level using either ammonia or potassium hydroxide and hydrogen, but that the activity due to $K^{42}$ was much reduced when ammonia was used, the reduction being from $1 \times 10^5$ d.p.m./ml. using potassium hydroxide and hydrogen to $1.6 \times 10^3$ d.p.m./ml. when ammonia was used.

In order to check on the corrosion occurring, a millipore filter was included in the purification and sampling section of the loop and the impurities (crud) arising in the loop were deposited on this filter. Using potassium hydroxide and hydrogen the crud on the filter was reddish ochre in colour, indicating that the products of corrosion under these conditions included rust. When ammonia was used for control purposes the crud deposited on the filter was black in appearance, this suggesting that the main product of corrosion in this case was magnetite. It was also found that using ammonia in the coolant the crud was produced in small amounts initially but, after a short time, no further increase in the amount of crud deposited on the filter was noted. It is desirable that the product of any corrosion which may occur should be magnetite rather than rust, since magnetite is less readily removed from the surface on which it is formed and thus a layer of magnetite is formed which protects the metals from any further corrosion.

In the experiments using ammonia in the coolant, it was found that control of the corrosion of stainless steel was attained using ammonia concentrations as low as 4–7 p.p.m., but that control of the corrosion of mild steel could only be attained when ammonia concentrations of at least 15 p.p.m. were used.

In the second experiment the method of the invention was applied to an experimental reactor loop of ferritic steel operating with boiling water coolant, that is water slightly below its boiling point was introduced into the test section and a fraction of it boiled during passage over a stringer of fuel elements. After the test section the steam and water flows were separated and the steam was condensed. Make-up water was distilled, degassed, deoxygenated and demineralised. The loop was degassed at regular intervals to simulate direct cycle operation.

The loop operated at 70 kg./cm.$^2$ (1000 p.s.i.) with 100% water at its inlet and a nominal mixture at the outlet of 10% steam and 90% water by weight. The total flow through the test section was about 1500 kg./h. (3307 lbs./h.) and the steam production about 120 kg./h. (265 lbs./h.). The fuel stringer power was 60 kw. in the loop channel and the reactor power was in the range 30–40 M.W.

During this second experiment ammonia was added continuously by means of an injection pump, an equilibrium concentration being established by matching the injection rate with the loss due to radiolysis and leakage. Steady ammonia concentrations were obtained at the inlet to the test section at a number of levels between 2 and 6 p.p.m. The oxygen and nitrate concentrations in the steam and water respectively leaving the test section were determined at these levels. The results are shown graphically in the accompanying FIGURES 1 and 2 and it will be observed that the graphs are dotted below oxygen and nitrate concentrations of 0.01 p.p.m., the limit of accurate detection.

Figure 2:
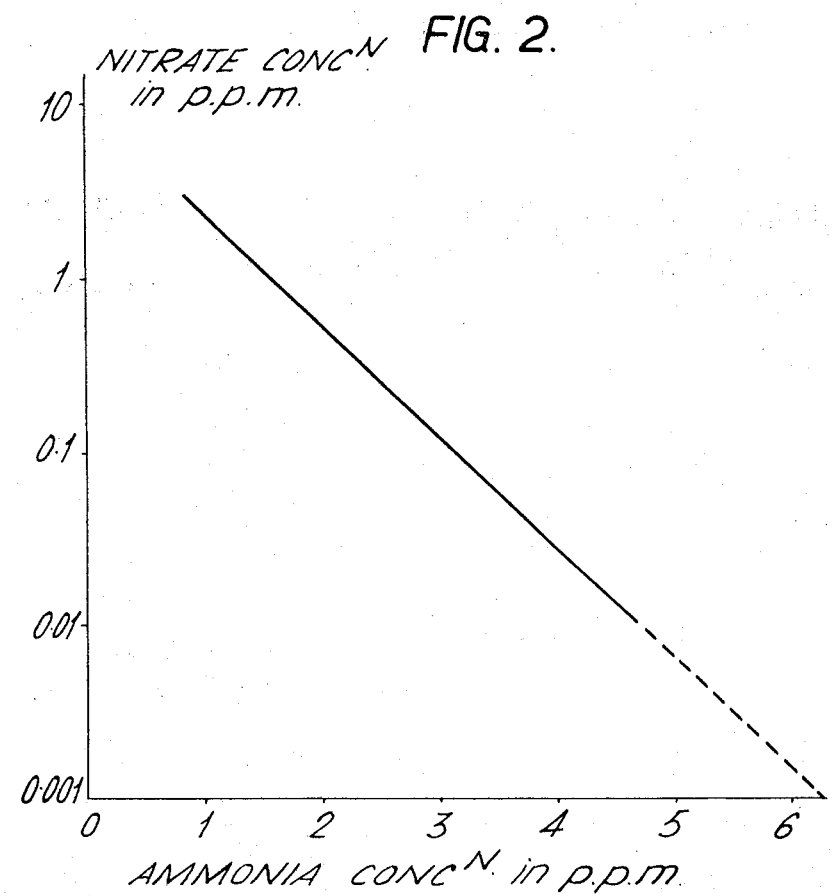
FIGURE 2 is a graph showing ammonia concentration vs. nitrate ion concentration.

FIGURES 1 and 2 of the accompanying drawings respectively show variation of log (oxygen concentration in steam phase) and variation of log (nitrate concentration in water phase) with ammonia concentration. It is apparent from these graphs that even in a ferritic steel circuit ammonia suppresses the radiolytic production of oxygen in a boiling regime and that it also decreases the nitrate production rate.

Figure 3:
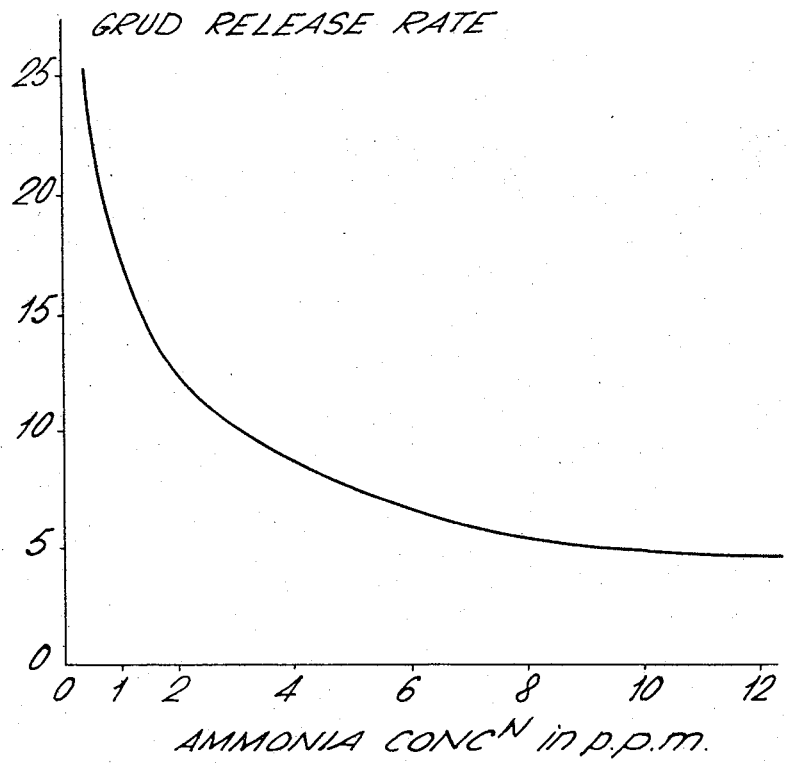
FIGURE 3 is a graph showing ammonia concentration vs. crud release rate.

The total reduction in crud release rate—a measure of the extent of corrosion in the coolant circuit—with increase in ammonia concentration was not measured directly. However a proportion of the loop water was passed through a millipore filter and the solids deposited on the filter were examined. It was observed that the crud level decreased as the ammonia concentration increased as shown in FIG. 3 where the crud release rate is expressed in arbitrary units.

The above experiments demonstrate that it is possible for a reactor coolant circuit carrying water to use ferritic steel in place of the conventional stainless steel if the ammonia concentration in the coolant is maintained at at least 4 p.p.m. Exceptions may arise in those parts of the coolant circuit where oxygen content may be particularly high due to oxygen (air) in leakage, e.g. at the turbine condenser. Further since the ammonia additions to the coolant inhibit oxygen production it is considered that with ammonia in the coolant the liability for chloride stress cracking to occur in the superheat channels of boiling water reactors tends to be reduced. Hence stainless steel may be used for such channels.

In a further experiment in which steam only was introduced into the test section no oxygen was detected in the outlet from the test section with ammonia concentrations in the feed stem in the range 5–16 p.p.m.

I claim:

1. In a method for reducing the corrosion conditions in a water-cooled nuclear reactor having a means for circulating a coolant through the reactor to cool the same, the improvement consisting of adding to the coolant a single material to control radiolysis of the coolant, said material being ammonia which is added to the coolant in an amount sufficient to give and maintain an ammonia concentration of from 4 to 60 p.p.m. by weight in the coolant.

2. The method of claim 1 wherein the reactor is a pressurized water cooled reactor and the ammonia concentration in the coolant is maintained in the range of 20–25 p.p.m. by weight.

3. The method of claim 1 wherein the reactor is a boiling water reactor system in which the coolant is passed directly to a turbine and the ammonia concentration in the coolant is maintained in the range of 4 to 20 p.p.m. by weight.

4. The method of claim 1 wherein the reactor is a steam-cooled reactor and the ammonia concentration in the steam coolant is in the range of 5–16 p.p.m. by weight.

References Cited by the Examiner

UNITED STATES PATENTS 2,937,981   5/1960   Allen et al. _____ 176—92 X
3,032,386   5/1962   Smith et al. _____ 252—387 X

OTHER REFERENCES

AECL–1800, July 1963 (paper presented May 20–22, 1963) pp. 1–9.

WAPD–MRP–69, December 1957, pp. 1, 32, 33, and 69.

CARL D. QUARFORTH, *Primary Examiner.*

L. DEWAYNE RUTLEDGE, *Examiner.*